Nov. 22, 1938.   F. N. ROSS   2,137,883
TRIM PANEL AND FASTENER
Filed Aug. 15, 1936   2 Sheets-Sheet 1
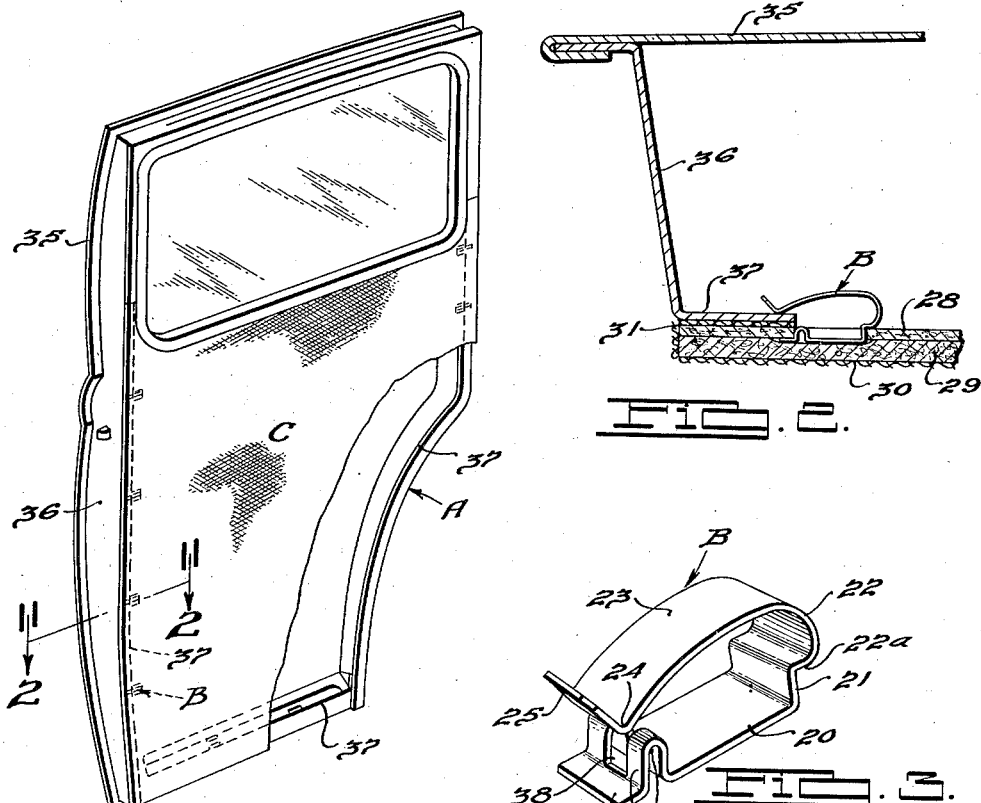
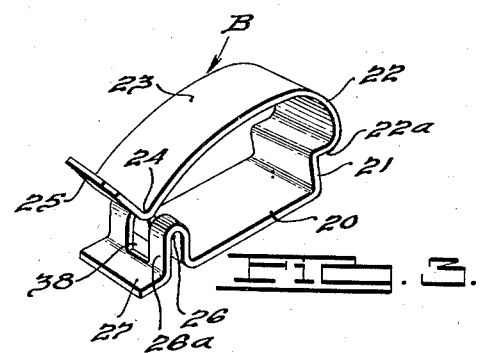
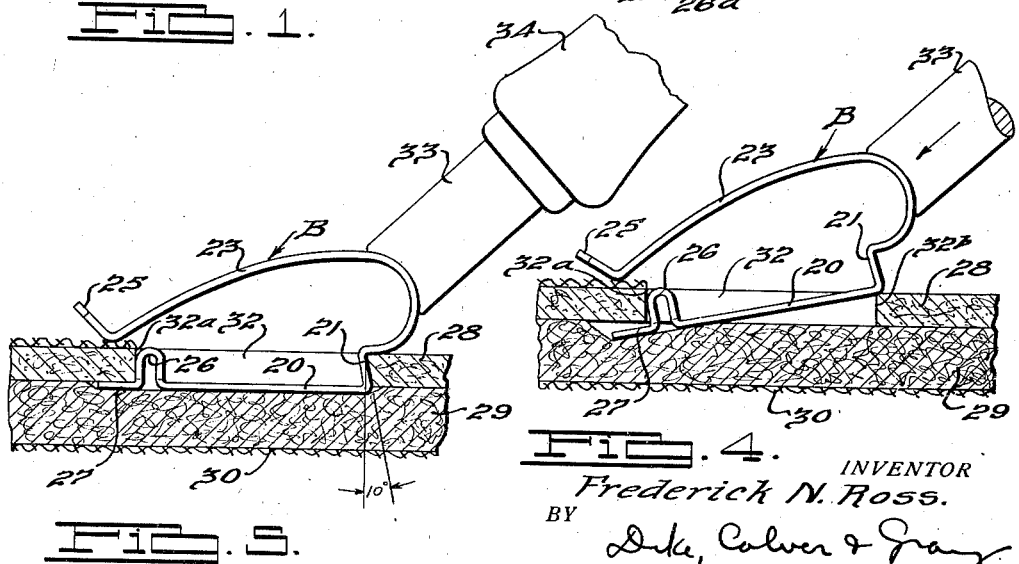
INVENTOR
Frederick N. Ross.
BY
Duke, Colver & Gray
ATTORNEYS.

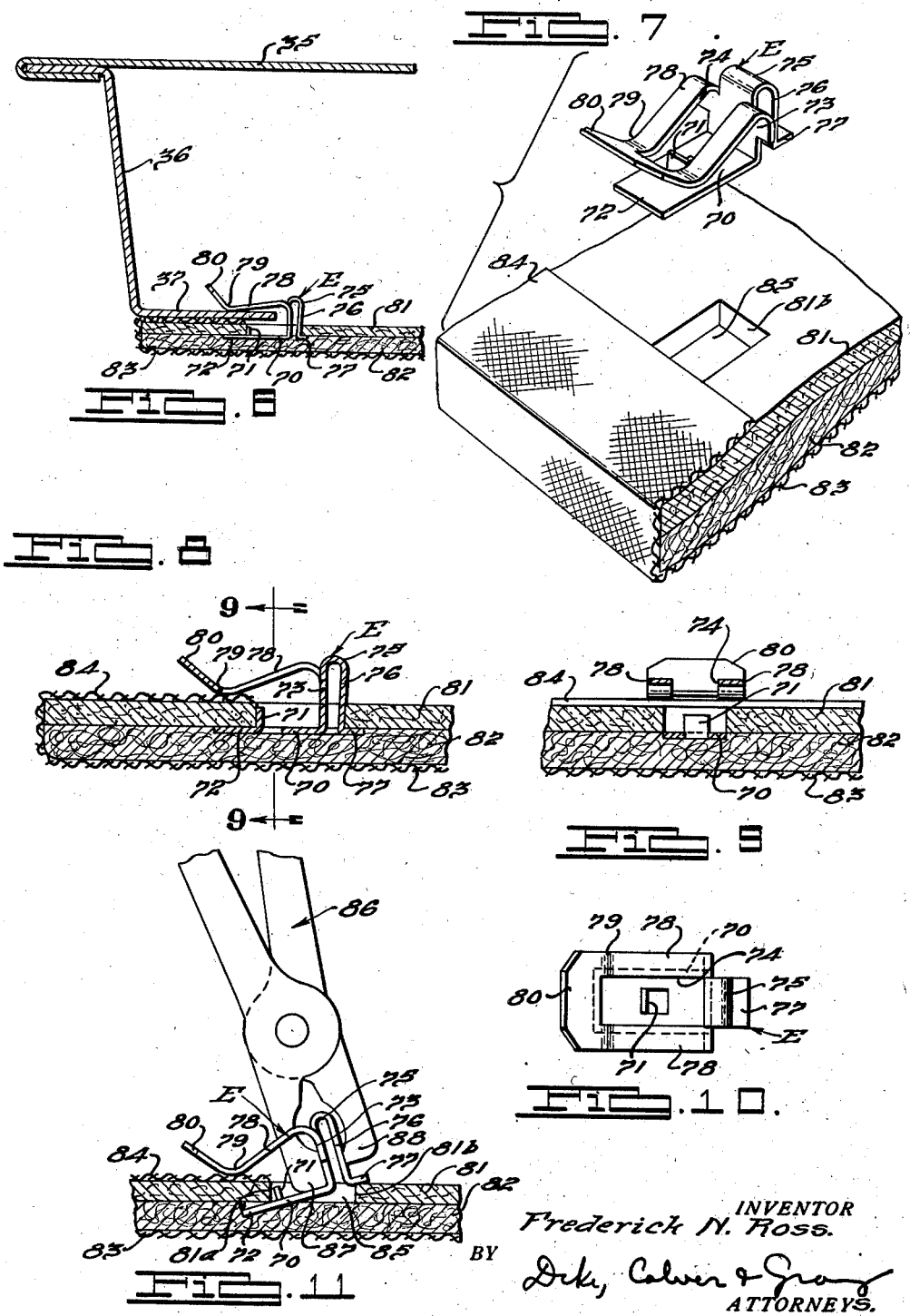

Patented Nov. 22, 1938

2,137,883

UNITED STATES PATENT OFFICE 2,137,883

TRIM PANEL AND FASTENER

Frederick N. Ross, Detroit, Mich., assignor to Briggs Manufacturing Company, Detroit, Mich., a corporation of Michigan Application August 15, 1936, Serial No. 96,185

7 Claims. (Cl. 24—259)

This invention relates to trim panels or trim panel assemblies particularly adapted for use in the interior trim finish of automobiles or other vehicle bodies and especially to fastener devices for trim panels.

An object of the invention is to provide a trim panel for a vehicle body with improved fastener means for removably attaching the panel to the vehicle door or other portion of the body framing with ease and facility.

A further object of the invention is to provide a new and improved interior trim panel, or trim panel assembly, together with a new and improved fastener device for detachably securing the panel to the body so that by virtue of the invention there is provided a fastener device of relatively simple construction which may be manufactured at low cost and assembled on the panel with a minimum of time and labor and enabling the provision of a trim panel which may be easily applied to the door or other framing of the vehicle body.

Another object of the invention is to provide an improved fastener device for a trim panel which may be cheaply and easily manufactured from a single piece or strip of metal and which may be assembled on the trim panel after applying the trim material thereto without the necessity of using separate retainer or clip devices for holding the fastener element in place.

Other objects of this invention will appear in the following description and appended claims, reference being had to the accompanying drawings forming a part of this specification wherein like reference characters designate corresponding parts in the several views.

Fig. 1 is a perspective view, partly broken away, illustrating an automobile door having installed thereon a trim panel constructed in accordance with the present invention.

Fig. 2 is an enlarged fragmentary section taken through line 2—2 of Fig. 1 in the direction of the arrows.

Fig. 3 is a perspective view of the fastener illustrated in Fig. 2.

Figs. 4 and 5 are enlarged sections illustrating the method of assembling the fastener in the foundation sheet of the trim panel.

Fig. 6 is a view similar to Fig. 2 illustrating another embodiment of the invention.

Fig. 7 is a perspective view illustrating this embodiment of the invention, and showing the fastener preparatory to its attachment to the trim panel.

Fig. 8 is a central longitudinal section through the fastener and panel illustrating this embodiment of the invention.

Fig. 9 is a vertical section taken through lines 9—9 of Fig. 8 in the direction of the arrows.

Fig. 10 is a plan view of the fastener of this embodiment; and

Fig. 11 is a section illustrating the mode of assembly of the fastener to the panel.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to Figs. 1 to 5 inclusive of the drawings, there is illustrated, by way of example, a door A for an automobile body having mounted thereon through the medium of fasteners B, a trim panel C, the fasteners in this instance being constructed in accordance with the embodiment illustrated in Figs. 2 to 5 inclusive. It will be understood that the trim panel may be of different shapes and sizes and may be mounted on the doors or at other locations on the inside of the vehicle body.

The trim fastener B of the embodiment of Figs. 2 to 5 inclusive comprises a one-piece device formed from a single metallic strip, preferably spring steel, and has a flat base or shank 20 terminating at its rear edge in an upstanding wall or abutment 21 forming the heel of the device. From the upper edge of the abutment 21 the metal of the strip is formed with a reverse goose-neck bend providing a spring bow 22, it being noted that this bow comprises a rearwardly extending horizontal portion 22a adapted, as later described, to overlie the foundation sheet of the trim panel. The metal of the strip from which the fastener is made is extended forwardly and downwardly from the spring bow to provide an extension 23 bent at 24 to produce a curved gripping portion and an upwardly inclined or flaring lead end 25. The flat base or shank 20 is formed near the forward end thereof with a reverse goose-neck bend 26, the forward wall 26a of this goose-neck portion providing an upstanding abutment, the material of the base being extended forwardly from this abutment to provide a relatively short flange or lip 27 lying in the plane of the body portion 20. The reverse bend or goose-neck portion 26 provides an expansible and contractible spring and the resiliency thereof is preferably increased by cutting through the same to provide a slot 36.

The trim fastener B is applied to and assembled with a trim panel which in the present instance comprises a foundation or backing sheet 28 of fiber board or other suitable material. The front face of the backing sheet is preferably covered by means of a padding material 29 of compressed jute or other fibrous substance and this layer is in turn covered with a trim fabric 30 which is folded around the edges of the foundation sheet 28 as indicated at 31 and cemented at the rear face of the foundation sheet along the edges thereof. At suitable points along the side and bottom edges of the trim panel and inwardly of the cemented edges of the fabric material the foundation sheet 28 is provided therethrough with holes or slots 32 which in the present instance are substantially rectangular in shape. These holes or apertures are of a predetermined area or shape so that when the fastener is installed that portion thereof extending from the abutment 26a to the abutment 21 will preferably fill and close the holes.

The fastener B may be readily assembled on the trim panel by first inserting the lip or flange extension 27, which lies forwardly of the abutment 26a, into the aperture 32 so as to extend beneath and underlap the forward edge 32a of the aperture, as illustrated in Fig. 4, with the abutment 26a engaging the forward edge 32a of the aperture. The rear end of the fastener may be forced into the aperture 32 either by hand or through the medium of a tool 33 provided with a handle 34, the working end of the tool having a curved face conforming to and engageable with the curved spring bow portion 22, as illustrated in Figs. 4 and 5. By exerting a forward thrust against the rear end of the fastener through the medium of the tool 33 the spring portion 26 may be compressed against the edge 32a of the foundation material sufficiently to permit the heel 21 to clear the rear edge 32b of the aperture. The heel is thus forced into the aperture and upon releasing the pressure applied to the fastener through the medium of the tool the expansion of the spring portion 26 will force the heel 21 into tight frictional engagement with the edge 32b. Thus, the abutments 26a and 21 will be held against the edges 32a and 32b respectively under the spring tension exerted by the goose-neck portion 26. Preferably, as illustrated in connection with this embodiment, the upstanding abutment 21 is inclined rearwardly from the top edge thereof to the bottom, the inclination thereof with respect to the vertical being illustrated as approximately 10°. As a consequence of this construction the lower corner of the heel, due to the expansion effect of the spring 26, will be slightly embedded in the material of the foundation sheet 28, the pressure of the abutment 21 resulting in slightly compressing the material of the edge 32b, as illustrated in Fig. 5, into substantially an undercut formation thereby increasing the frictional gripping effect of the edges of the aperture on the abutments 21 and 26a.

In the present instance the trim panel is assembled on the vehicle door A. As illustrated in Figs. 1 and 2 the door comprises an outer body panel 35 attached in the usual manner to the upright pillar 36 which at the rear side thereof has an inwardly directed vertically extending flange 37. The framing of the door is such as to provide the flange 37 around the sides and bottom thereof. When assembled on the door structure the trim panel is provided with fasteners B along the sides and bottom thereof. The panel may be readily installed by inserting the flared or lead ends 25 behind the flange 37 along one vertical side of the door and then forcing the panel laterally so as to force the gripping portions 24 of the fasteners over the back face of the flange, the gripping portions being forced or sprung out during this operation so as to grip the flange 37 and clamp the same between the gripping portion and the rear face of the backing sheet 28. The panel may then be bowed outwardly to a sufficient extent to permit the fasteners at the opposite vertical edge of the panel to engage behind the edge of the flange 37 at the opposite side of the door. By flattening out the panel these fasteners will be forced into gripping engagement with the flange. The panel may then be slid downwardly so as to cause the fasteners at the lower edge thereof to engage behind the bottom flange 37 of the door.

Referring to the embodiment of my invention illustrated in Figs. 6 to 11 inclusive, it will be seen that the fastener E in this instance also comprises a one-piece device formed from a single metal strip and is adapted to be installed in an aperture or hole in the foundation sheet of the trim panel thereby providing a trim panel assembly which may be applied to the door A, or other frame portion of the vehicle body, in substantially the same manner as previously described. The fastener E in this instance preferably comprises a flat body, shank or base 70 having near its forward end an upstanding abutment or lug 71 preferably struck out from the material of the base 70. The latter has a lip or tongue 72 extending forwardly from the bottom of the abutment 71. At the rear end of the base 70 the metal of the strip is bent upwardly to provide an upstanding wall 73 which is reversely and forwardly bent to provide a spring bow, as illustrated, extending forwardly and downwardly to overlie the base 70 and provide a gripping member 78. Struck up from the metal of the gripping member 78, as shown by the opening or slot 74, is a member which is bent rearwardly from the upper edge of the wall 73 to provide a spring bow or goose-neck portion 75 the latter being extended vertically to provide a wall 76 terminating at its lower edge and in the plane of the base 70 in a rearwardly extending lip or flange 77. The gripping member 78 is bent near its forward end to produce a curved gripping portion 79 and the material from this point is bent forwardly and upwardly to provide a flaring lead end 80. From this construction it will be seen that the fastener comprises a base 70, a forward upstanding abutment 71, a spring gripping member 78, a goose-neck portion 75 forming an expansible and contractible spring member provided with an abutment wall 76, all produced preferably from a single metal strip. In the illustrated embodiment the gripping member 78 is made somewhat wider than the base 70 for the purpose of providing sufficient stock for forming therefrom the parts 75—77.

The trim fastener E is preferably applied to and assembled with a trim panel which comprises a foundation or backing sheet 81 of fiber board or other suitable material. The front face of the backing sheet is preferably covered by a layer of padding 82, as hereinbefore described, which in turn is covered with a fabric material 83 folded around the edges of the backing sheet 84 and cemented thereto. At suitable points along the side and bottom edges of the trim panel the foundation sheet 81 is provided therethrough with holes or slots 85 which in the present instance are substantially rectangular in shape. The fastener may be readily assembled on the trim panel by means of pliers or other suitable tool 86 having a jaw 87 insertable through the slot 74 against the wall 73 and the base 70, as shown in Fig. 11, and also having a jaw 88 adapted to engage the wall 76 of the spring retainer member. The fastener may be assembled by first inserting the tongue or extension 72 into the aperture 85 so as to extend beneath and underlap the edge 81a of the aperture with the abutment 71 bearing against this edge. By forcing the jaws of the tool together the wall 76 may be sprung sufficiently to permit the lip 77 to clear the edge 81b and hence the heel of the fastener may be forced into the aperture 85. By releasing the tool the expansion effort of the spring 75 will force the lip 77 beneath the edge 81b, as illustrated, and clamp the wall 76 and abutment 71 against the opposite edges of the aperture.

After the fasteners E have been installed on the rear face of the foundation sheet along the side and bottom edges thereof the trim panel may be applied to the door A, or other portion of the body, in the same manner as previously described so as to cause the gripping members 43 of the fasteners to engage behind the flanges 37 of the door or other body framing in the manner illustrated in Fig. 6.

I claim:

1. A trim fastener having a base comprising two sections extending end to end in substantially the same plane, an upstanding U-shaped spring abutment yieldingly connecting said sections together for relative endwise movement, an upstanding abutment formed from said base at a point on said base relatively remote from said spring abutment, and a spring gripping member extended from one of said abutments.

2. A trim fastener having a base comprising two sections extending end to end in substantially the same plane, an upstanding U-shaped spring abutment yieldingly connecting said sections together for relative endwise movement, a second abutment formed from said base, one of said abutments being located intermediate the ends of the base, and a spring gripping member extended from one of said abutments.

3. A trim fastener having a base comprising two sections extending end to end in substantially the same plane, an upstanding U-shaped spring abutment yieldingly connecting said sections together for relative endwise movement, an upstanding abutment formed from said base at a point on said base relatively remote from said spring abutment, and a spring gripping member extended from said upstanding abutment.

4. A trim fastener having a base comprising two sections extending end to end in substantially the same plane, an upstanding U-shaped spring abutment yieldingly connecting said sections together for relative endwise movement, a second abutment formed from said base, one of said abutments being located intermediate the ends of the base, and a spring gripping member extended from said second abutment.

5. A trim fastener having a base comprising two sections extending end to end in substantially the same plane, an upstanding U-shaped spring abutment yieldingly connecting said sections together for relative endwise movement, a second abutment formed from said base, one of said abutments being located intermediate the ends of the base, and a spring gripping member extended from said U-shaped spring abutment.

6. A trim fastener having a base comprising two sections extending end to end in substantially the same plane, an upstanding U-shaped spring abutment yieldingly connecting said sections together for relative endwise movement, an upstanding abutment formed from said base at a point on said base relatively remote from said spring abutment, said spring abutment comprising relatively yieldable walls, and a spring gripping member extending integrally from one of said walls.

7. A trim fastener having a base comprising two sections extending end to end in substantially the same plane, an upstanding U-shaped spring abutment yieldingly connecting said sections together for relative endwise movement, an upstanding abutment formed from said base at a point on said base relatively remote from said spring abutment, said spring abutment comprising relatively yieldable walls, and a spring gripping member having two spaced tongues extending integrally from the opposite side edges of one of said walls.

FREDERICK N. ROSS.